(12) United States Patent
Damm et al.

(10) Patent No.: US 12,492,143 B2
(45) Date of Patent: Dec. 9, 2025

(54) COMPOSITE WORKPIECE, METHOD OF MANUFACTURING, DEVICE AND USE OF SUCH A COMPOSITE WORKPIECE

(71) Applicant: Schott AG, Mainz (DE)

(72) Inventors: Thorsten Damm, Eltville am Rhein (DE); Clemens Ottermann, Hattersheim (DE); Jens Herrmann, Selzen (DE)

(73) Assignee: Schott AG, Mainz (DE)

( * ) Notice: Subject to any disclaimer, the term of this patent is extended or adjusted under 35 U.S.C. 154(b) by 1036 days.

(21) Appl. No.: 17/545,547

(22) Filed: Dec. 8, 2021

(65) Prior Publication Data

US 2022/0177362 A1   Jun. 9, 2022

(30) Foreign Application Priority Data

Dec. 8, 2020   (DE) ............... 10 2020 132 708.0

(51) Int. Cl.
| | |
|---|---|
| *C03C 17/34* | (2006.01) |
| *B32B 17/06* | (2006.01) |
| *G02B 1/11* | (2015.01) |
| *G02B 1/113* | (2015.01) |
| *G02B 1/115* | (2015.01) |
| *G02B 27/01* | (2006.01) |

(52) U.S. Cl.
CPC .......... *C03C 17/3411* (2013.01); *G02B 1/115* (2013.01); *G02B 27/0172* (2013.01); *C03C 2217/734* (2013.01); *C03C 2218/154* (2013.01); *G02B 2027/0178* (2013.01)

(58) Field of Classification Search
CPC ............. C03C 17/3411; C03C 17/3417; C03C 17/3429; G02B 1/115; G02B 1/11; G02B 1/113; G02B 27/0172; G02B 2027/0178; B32B 17/06; B32B 2255/20
See application file for complete search history.

(56) References Cited

U.S. PATENT DOCUMENTS

| | | | |
|---|---|---|---|
| 2020/0041698 A1 | 2/2020 | Damm et al. | |
| 2020/0041794 A1 | 2/2020 | Damm | |
| 2020/0041804 A1* | 2/2020 | Thomas | ............... G02B 27/142 |

OTHER PUBLICATIONS

German Office Action dated Jun. 25, 2021 for German Application No. 10 2020 132 708.0 (8 pages).

* cited by examiner

*Primary Examiner* — Joanna Pleszczynska
(74) *Attorney, Agent, or Firm* — TAYLOR & EDELSTEIN, PC

(57) ABSTRACT

At least one composite workpiece includes: a substrate body including at least one first surface and at least one second surface, the at least one first surface of the substrate body being shaped convexly at least in areas and the at least one second surface of the substrate body being shaped concavely at least in areas, and the at least one composite workpiece has a bow with an absolute value of between 0.1 μm and 50 μm due to the curved shape of the at least one first surface and the at least one second surface; and at least one first coating, at least the at least one first surface of the substrate body being coated at least in areas with the first coating.

16 Claims, 2 Drawing Sheets

US 12,492,143 B2

COMPOSITE WORKPIECE, METHOD OF MANUFACTURING, DEVICE AND USE OF SUCH A COMPOSITE WORKPIECE

CROSS REFERENCE TO RELATED APPLICATIONS

This application claims priority to German Patent Application No. DE 10 2020 132 708.0 filed on Dec. 8, 2020, which is incorporated in its entirety herein by reference.

BACKGROUND OF THE INVENTION

1. Field of the Invention

The present invention relates to a composite workpiece, a method for manufacturing such a composite workpiece, augmented reality glasses including such a composite workpiece, and a use of such a composite workpiece.

2. Description of the Related Art

Augmented reality is a technological field of intense activity that serves a number of fields of application, including entertainment, medicine, education, construction, and transportation, to name only a few examples. Unlike the related field of virtual reality, augmented reality focuses on a tight integration of multimedia information with real-world sensory input, typically by selectively overlaying a digital image onto an spectacles window.

In this case, the spectacles windows are regularly made of wafers that have special structures for light or image guidance. These structures are themselves created by applying an embossing punch to the untreated wafer. During the embossing process, however, individual wafers can break due to the high forces acting on the wafer. This leads to higher production costs.

What is needed in the art is a way in which the disadvantages of the prior art can be overcome, and of which in particular the embossing process of wafers can be made safer, more reliable and more efficient.

SUMMARY OF THE INVENTION

In some exemplary embodiments provided according to the invention, at least one composite workpiece includes: a substrate body including at least one first surface and at least one second surface, the at least one first surface of the substrate body being shaped convexly at least in areas and the at least one second surface of the substrate body being shaped concavely at least in areas, and the at least one composite workpiece has a bow with an absolute value of between 0.1 µm and 50 µm due to the curved shape of the at least one first surface and the at least one second surface; and at least one first coating, at least the at least one first surface of the substrate body being coated at least in areas with the first coating.

In some exemplary embodiments provided according to the invention, a method of manufacturing a composite workpiece is provided. The composite workpiece includes: a substrate body including at least one first surface and at least one second surface, the at least one first surface of the substrate body being shaped convexly at least in areas and the at least one second surface of the substrate body being shaped concavely at least in areas, and the at least one composite workpiece has a bow with an absolute value of between 0.1 µm and 50 µm due to the curved shape of the at least one first surface and the at least one second surface; and at least one first coating, at least the at least one first surface of the substrate body being coated at least in areas with the first coating. The method includes: providing the substrate body; applying a coating onto a surface of the substrate body; and maintaining a substrate temperature at less than or equal to 200° C. at least temporarily or continuously during the application of the coating onto the surface of the substrate body.

In some exemplary embodiments provided according to the invention, augmented reality glasses include at least one composite workpiece. The at least one composite workpiece includes: a substrate body including at least one first surface and at least one second surface, the at least one first surface of the substrate body being shaped convexly at least in areas and the at least one second surface of the substrate body being shaped concavely at least in areas, and the at least one composite workpiece has a bow with an absolute value of between 0.1 µm and 50 µm due to the curved shape of the at least one first surface and the at least one second surface; and at least one first coating, at least the at least one first surface of the substrate body being coated at least in areas with the first coating.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
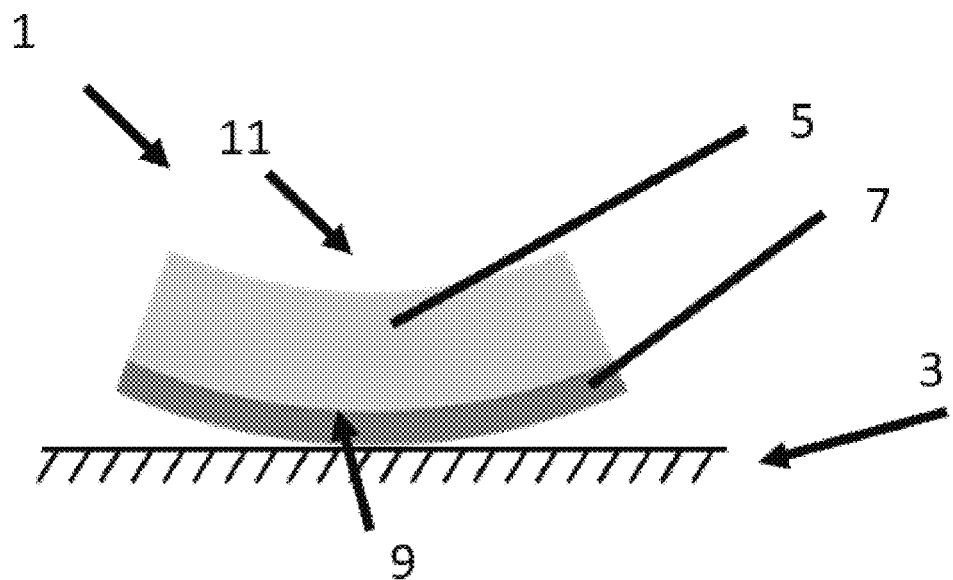
FIG. 1 illustrates a cross-sectional view of an exemplary embodiment of a composite workpiece provided according to the invention.

Exemplary embodiments provided according to the present invention provide a composite workpiece including a substrate body, such a wafer, and at least one first coating. The substrate body has at least one first surface and at least one second surface, the first surface of the substrate body is shaped convexly at least in areas and the second surface of the substrate body is shaped concavely at least in areas, and the composite workpiece, in particular the substrate body, has a bow with an absolute value of between 0.1 µm and 50 µm due to the curved shape of the first and second surfaces. At least the first surface of the substrate body is coated at least in areas with the first coating.

Exemplary embodiments provided according to the invention are based on the surprising finding that by providing the first coating on the side of the substrate body that is convex as a result of the bow, such as a wafer, due to the first coating the strength of the substrate body for forces acting on its concave side can be significantly increased.

This, in turn, makes the composite workpiece significantly more resistant and much better able to withstand the action of the embossing punch during the embossing process. Thus, the risk of a breaking of the substrate body during the embossing process is drastically reduced. This goes hand in hand with lower scrap, a more efficient manufacturing process and thus leads to lower overall production costs. Even higher forces can be applied without worrying about damaging or even destroying the substrate body. This also allows the structures to be produced with greater forces on the substrate body, resulting in a more reliable formation of these structures and thus a higher quality product.

For example, the structures can be produced by use of the nano-imprint lithography (NIL). For this purpose, for example, a polymer or another plastic is applied to the second surface via spin coating, for example over the entire surface. Subsequently a punch is pressed into this polymer, thus imprinting a lattice structure. The structure is cured by a UV process.

In addition, safety is also significantly increased. This is because the composite workpiece is also less susceptible during the stamping process to the occurrence of unnoticed preliminary damages, which can be a starting point for breakage of the substrate body when even comparatively small forces act on the substrate material in the further course.

As a result, the production of wafers from which spectacles windows for augmented reality glasses are cut can be carried out considerably more efficiently, reliably and with higher quality results.

This finding is particularly surprising because even with first coatings that exhibit compressive stress, the beneficial effects on the resistance of the coated substrate body for forces acting on the second surface are observed. In turn, a compressive stress leads to a tensile stress at the interface of the substrate body—especially in the case of glass as the substrate body. However, according to conventional understanding, a tensile stress reduces the surface strength of the substrate body. However, by applying the first coating onto the convex side of the substrate or wafer, the strength for forces acting on the concave side is increased—contrary to previous understanding and conventional habit, as long as the bow remains within the described limits.

Apparently, the combination of inherently—according to conventional thinking—disadvantageous compressive and tensile stresses in the first coating and the substrate body, on the one hand, and bow, on the other hand, results in a composite workpiece with overall advantageous strength properties for the manufacture of glasses for augmented reality glasses.

That is, the strength of the entire composite workpiece for forces acting on the second surface is increased in the composite workpiece provided according to the invention. That is, the strength of the composite workpiece against breakage when subjected to a corresponding external force is increased. In the opinion of the inventors, this in turn can be attributed to the altered strength properties of the first surface as a result of the interaction between the first coating and the substrate body in cooperation with the bow as a causal factor. In particular, the surface strength of the substrate body can be thought of here.

When carrying out a surface strength measurement (for example by the "ring-on-ring" test), it has been found that the coated first surface of the substrate body results in a composite workpiece which has a higher strength value in terms of surface strength on the coated side than an uncoated substrate body or than the insofar uncoated second surface of the substrate body.

In the context of this application, the "ring-on-ring" method may be carried out in accordance with European Standard EN 1288-5:2000, in particular in accordance with part 5 thereof. Here, a load ring with a radius of 6 mm and a support ring with a radius of 30 mm are used.

In some embodiments, in the "ring-on-ring" method, the quasi-static force is slowly increased continuously, in particular at a rate of 1 Newton per second.

Consequently, the "ring-on-ring" test method enables a strength measurement namely of the surface strength for example of the first and/or the second surface of the substrate body.

Accordingly, a compressive stress existing in the first coating seems to be harmless and, on the contrary, according to the inventors' experiments, even seems to lead to more advantageous overall strength values, provided that the coating is arranged on the convexly shaped surface. It is thus the structure of the interrelated variables of compressive stress (in the first coating, wherein the compressive stress in the entire first coating may be assumed to be homogeneous), tensile stress (in the substrate body, in particular in its first surface) and bow, which have a surprisingly extremely positive effect on the strength of the composite workpiece.

This makes the composite workpiece provided according to the invention particularly suitable for the manufacture of spectacles glasses used in augmented reality glasses. This is because the substrate body is more resistant to the force of the embossing punch acting on one (namely the second) surface of the substrate body, if the, for example, opposite (namely the first) surface is coated accordingly and the composite workpiece has a bow within certain limits.

Moreover, quite thin substrate bodies can thus be used for augmented reality glasses, since their strength can be sufficiently increased.

The bow may be measured according to SEMI 3D12-0315 2015.

In some embodiments, the first coating is applied directly or indirectly to the first surface, at least in areas. When applied directly, the first coating is in direct contact with the first surface. When applied indirectly, the first coating has no direct contact with the first surface. In the latter case, for example, one or more intermediate layers, in particular fully or partially sandwiched, may be arranged between the first surface and the first coating, at least in areas. Optionally, the first coating is applied directly in areas and indirectly in areas to the first surface.

In some embodiments, the substrate body comprises at least a first main side and the first main side includes the first surface as a surface. In some embodiments, the substrate body alternatively or additionally comprises at least one second main side, for example opposite the first main side, and the second main side comprises the second surface as a surface. In some embodiments, the substrate body comprises at least one side face, which may be connecting the first and second main faces to one another and/or extending around the outside, and the side face comprises at least one third surface as a surface, wherein in particular the side face of the substrate body is formed chamfered, for example on both sides.

In some embodiments, the composite workpiece, in particular the substrate body, has a wafer-like shape or is formed in the shape of a wafer. For example, the first coating extends along the thickness direction of the wafer on the substrate body. Optionally, each layer has further sub-layers.

In some embodiments, the composite workpiece is an optical composite workpiece, in particular an optical layered composite workpiece.

Thus, the composite workpiece provided according to the invention is sometimes particularly suitable as a starting material for glasses for diffractive eyeglasses technologies, in particular augmented reality glasses.

Exemplary embodiments provided according to the invention may be provided precisely whenever a PVD coating is to be provided as the first coating on the substrate body, whenever the substrate body is thin, in particular thinner than 1.5 mm and/or thicker than 0.1 µm, and/or whenever the strength of the substrate body, such as in particular a substrate body made of glass, is not to be negatively influenced, in particular not reduced, despite the coating. For example, the strength is thereby kept at least constant or may be increased.

Alternatively or additionally, it may also be provided that the first coating comprises an anti-reflective coating, in particular the anti-reflective coating comprises titanium, comprises (a) $Si_3N_4$, $ZrO_2$, $Ta_2O_5$, $HfO_2$, $Nb_2O_5$, $TiO_2$, $SnO_2$, indium tin oxide, $ZnO_2$, AlN, a mixed oxide comprising at least one thereof, a mixed nitride comprising at least one thereof, or a mixed oxide nitride comprising at least one thereof, (b) $ZrO_2$, $Ta_2O_5$, $HfO_2$, $Nb_2O_5$, $TiO_2$, or a mixed oxide comprising at least one thereof and/or (c) $SiO_2$, $MgF_2$ and a mixed oxide comprising $SiO_2$, and a further oxide; can be applied or is applied onto the substrate body by a vapor deposition and/or sputtering process; is amorphous; and/or has a thickness of less than or equal to 400 nm, less than or equal to 350 nm, less than or equal to 300 nm, less than or equal to 250 nm, less than or equal to 200 nm, less than or equal to 150 nm, less than or equal to 100 nm or less than or equal to 50 nm and/or of greater than or equal to 50 nm, greater than or equal to 100 nm, greater than or equal to 150 nm, greater than or equal to 200 nm, greater than or equal to 250 nm or greater than or equal to 300 nm; that only the first surface of the substrate body is coated with the first coating; and/or that the second surface of the substrate body is not coated with the first coating.

By providing the first coating as an anti-reflective (AR) coating, not only the strength of the composite workpiece can be improved, but also its suitability as a starting material for spectacles glasses for augmented reality glasses can be increased. This is because applications in this field typically require on glasses non-reflecting on one side in order to achieve an improved, in particular reflection-free, superimposition of the overlaid data on the external image.

In some embodiments, the first coating can be applied or applicable to the first surface by a PVD process.

Surprisingly, it has been recognized that in particular PVD-based coatings (for example, evaporation, ion-assisted evaporation, and sputtering), have a low compressive stress (and thus produce little tensile stress in the substrate material) when the process is suitably controlled, and increase the surface strength of the substrate material, in particular of the first and/or second surface. Thus, such coatings may be provided for the first coating.

In an exemplary first coating, the strength, i.e. in particular the surface strength, of the coated first surface of the substrate body can thus be increased by a factor of at least 1.1, in particular at least 1.5, at least 2, or at least 4. Alternatively or additionally, the strength can be increased thereby by the factor of at most 5, for example at most 4 or at most 3. Alternatively or additionally, the strength can thus be increased by a factor between 1.1 and 5, in particular between 1.1 and 4, between 1.2 and 3 or between 1.2 and 2.

In some embodiments, the factors are considered in comparison to an uncoated substrate body or even the uncoated second surface of the substrate body.

Thus, an increase in the strength of the substrate body against forces acting on the second surface can be achieved by an equal factor.

"PVD" in this context means physical vapor deposition. It is state of the art in the coating of optical systems and therefore does not need to be explained in detail here.

By producing the first coating by PVD processes, taking into account the process control described herein, a coating with low compressive stress can be obtained. This is because these coatings can exhibit a compressive stress. This compressive stress then in turn leads to a tensile stress at the substrate body at the interface. By forming a corresponding low bow, a composite workpiece according to the invention can thus be easily obtained in this way.

In addition, PVD technologies are well suited for realizing single and multilayer coatings with precise layer thicknesses. This property leads to particularly good results, especially for an anti-reflective coating.

It was surprisingly recognized that an argon content of the primary deposited material of the first coating leads to an additional increase of the surface strength of the second surface in addition to a relatively low compressive stress. Thus, by controlling the argon content, moreover, a fine adjustment of the compressive stress in the first coating can be achieved. In this context, an argon content of up to 10 wt.-%, for example less than 5 wt.-% or less than 2 wt.-%, may be provided.

The first coating only on the first surface or not on the second surface leads to very good results in increasing the strength with respect to forces acting on the second surface.

Here, the first coating may exhibit such a small compressive stress that no or only a small (further) deformation of the substrate body occurs due to the first coating. Surprisingly, it turns out that when the coating has a compressive stress that leads to a (further) deformation of the substrate body, and when the first coating is still on the convex curved surface, the substrate body better withstands forces acting on the second surface, provided that the bow is appropriate.

In some embodiments, the first coating generates no or only a small additional bow in the composite workpiece, in particular the substrate body, i.e. the bow of the coated substrate body increases at most only slightly compared to the uncoated substrate body.

An exemplary first coating is suitable for reducing reflection of light incident on the coated first surface.

An exemplary first coating does not result in degradation of light propagation in the substrate body.

The first coating may coat at least 80% of the first surface with respect to the surface area, for example at least 90%, at least 95%, at least 99%, or the entire first surface.

An exemplary first coating comprises one or more coating layers. The first coating may be prepared as a stack of coating layers which are arranged as a stack of coplanar coatings.

The thickness of the first coating may be determined perpendicular to the first surface.

An exemplary first coating produces a region of low reflectance.

An exemplary region of low reflectance extends over the range of 450 to 650 nm. The maximum reflectance in the range from 450 to 650 nm may be not more than 50% of the maximum reflectance in the range from 450 to 650 nm for the substrate body that is uncoated, in particular with respect to the first coating, for example not more than 40% or not more than 30%.

The maximum reflectance in the range from 450 to 650 nm may be less than 5%, less than 4%, less than 3%, less than 2%, less than 1.5%, or less than 1.1%.

An exemplary region of low reflectance covers a wide range of wavelengths. In some embodiments, there is a region with a width of at least 175 nm, for example at least 200 nm, at least 225 nm, or at least 250 nm, in which the maximum reflectance minus the minimum reflectance is less than 1%.

An exemplary region of low reflectance is flat. The maximum reflectance in the range from 450 to 650 nm minus the minimum reflectance in the range of 450 to 650 nm may be less than 1.5%, less than 1.0%, or less than 0.8%.

Exemplary first coatings are amorphous. Exemplary first coatings comprise amorphous materials. Exemplary first coatings are non-crystalline. Exemplary first coatings do not lie in the long-range order. Exemplary first coatings do not exhibit columnar growth. Exemplary first coatings do not exhibit porous growth. Exemplary first coatings do not exhibit textured growth. An exemplary first coating comprises no more than 25% by volume, for example no more than 10% by volume or no more than 5% by volume of crystalline content. In some embodiments, the first coating does not include a crystalline material. In some embodiments, the first coating does not include columnar growth. In some embodiments, the first coating does not include porous growth. In some embodiments, the first coating does not include textured growth. The presence of columnar growth and the presence of textured growth may each be determined by inspection of a cross-sectional cut surface by use of a scanning electron microscope. The presence of crystalline material may be determined by Raman spectroscopy.

Alternatively or additionally, it may also be provided that the substrate body comprises glass; and/or that the substrate body has a thickness of less than or equal to 2 mm, less than or equal to 1.5 mm, less than or equal to 1 mm, or less than or equal to 0.5 mm, greater than or equal to 0.05 mm, greater than or equal to 0.07 mm, greater than or equal to 0.1 mm, greater than or equal to 0.3 mm, greater than or equal to 0.5 mm, or greater than or equal to 1 mm, and/or between 0.05 mm and 2 mm, between 0.07 mm and 2 mm, between 0.1 mm and 2 mm, between 0.3 mm and 2 mm, between 0.3 mm and 1.5 mm, or between 0.3 mm and 1 mm.

In the field of application of augmented reality glasses, the aforementioned thicknesses of the substrate body may be provided in order to achieve a high strength.

In some embodiments, the substrate body may be made of glass or comprise glass. In some embodiments, an exemplary glass for the substrate body is niobium phosphate glass. In some embodiments, an exemplary glass for the substrate body is lanthanum borate glass. In some embodiments, an exemplary glass for the substrate body is bismuth oxide glass. In some embodiments, an exemplary glass for the substrate body is a silicate-based glass.

An exemplary glass group includes one or more selected from the group consisting of niobium phosphate glass types, lanthanum borate glass types, bismuth oxide glass types, silicate glass types, while silicate glass types may include one or more of the following $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, BaO, SrO, ZnO, $Cs_2O$ and PbO.

An exemplary silicate-based glass comprises at least 30 wt.-% $SiO_2$, for example at least 40 wt.-% $SiO_2$ or at least 50 wt.-% $SiO_2$. An exemplary silicate glass comprises at least 80 wt.-% $SiO_2$, for example at least 70 wt.-% or at least 60 wt.-%. An exemplary silicate glass comprises $SiO_2$ in a range of 30 to 80 wt.-%, for example in a range of 40 to 70 wt.-% or in a range of 50 to 60 wt.-%. An exemplary silicate-based glass comprises one or more of the following selected from the group consisting of $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, BaO, SrO, ZnO, $Cs_2O$ and PbO, for example in a total amount of at least 20 wt.-%, at least 30 wt.-%, at least 40 wt.-%, or at least 50 wt.-%. An exemplary silicate-based glass comprises one or more of the following selected from the group consisting of $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, BaO, SrO, ZnO, $Cs_2O$ and PbO in a total amount of up to 70 wt.-%.

Alternatively or additionally, it may also be provided that the strength, in particular the surface strength, of the first coated surface of the substrate body is greater than or equal to the strength of the uncoated second surface of the substrate body, that the second surface withstands a greater force than the first surface; and/or that the strength of the first and/or the second surface of the substrate body is greater than or equal to 100 MPa, 150 MPa, 200 MPa or 250 MPa and/or is less than or equal to 1000 MPa, 500 MPa, 400 MPa, 300 MPa or 200 MPa.

The strength of the substrate body and, in particular, that of the second surface as well as that of the coated first surface can be determined, for example, by use of the "ring-on-ring" test method described above.

Surface strengths of the first surface of greater than or equal to 100 MPa, in particular of greater than or equal to 200 MPa, 300 MPa or 400 MPa, may be provided, especially in the field of application of augmented reality glasses, in order to be able to act on the second surface by the embossing punch with sufficient force to create the structures on the second surface.

This is because a force, such as that of an embossing punch, acts on the second surface, but is ultimately (also) received by the first surface. Therefore, the strength of the first surface (hence surface strength) represents an important criterion. And this strength is advantageously designed in exemplary embodiments provided according to the present invention according to the interaction of the first coating, the curved substrate body and the bow.

Alternatively or additionally, it can also be provided that a compressive stress exists in the first coating, at least in areas, wherein the compressive stress may be less than or equal to 100 MPa, less than or equal to 70 MPa, less than or equal to 50 MPa, less than or equal to 30 MPa, less than or equal to 20 MPa, or less than or equal to 10 MPa, greater than or equal to 11 MPa, greater than or equal to 10 MPa, greater than or equal to 20 MPa, greater than or equal to 30 MPa, greater than or equal to 50 MPa, greater than or equal to 70 MPa, or greater than or equal to 100 MPa, and/or is between 10 MPa and 50 MPa, in particular between 15 MPa and 40 MPa, for example between 15 MPa and 30 MPa, between 15 MPa and 25 MPa or between 20 MPa and 30 MPa.

In the field of application of augmented reality glasses, the aforementioned compressive stresses in the first coating may be provided in order to achieve desired strength values for the composite workpiece and in particular the second surface.

For example, the compressive stress existing in the first coating can be evaluated and/or determined by measuring the deformation of the substrate body before and after coating with the first coating, e.g., by interferometric methods. For example, the "Stoney" equation can be used for this purpose.

However, the bow of the composite workpiece or the substrate body, which can be negative or positive, is also a suitable measure. The additional bow after coating compared to the bow of the uncoated substrate body is a measure of the compressive or tensile stress in the first coating qualitatively and/or quantitatively. In some embodiments, and for the purpose of the invention, the stress can be determined in each case by use of the "Stoney" equation. The coating is best when the curvature after coating is comparable to the curvature of the uncoated substrate. This is because it is normally expected that the coated surface, especially when the coating optionally exhibits a compressive stress, will not become firmer. Instead, according to conventional expectations, the glass surface coated with a coating exhibiting a compressive stress has a lower strength.

Alternatively or additionally, it can also be provided that the bow is greater than or equal to 0.3 µm, greater than or equal to 0.5 µm, greater than or equal to 1 µm, greater than or equal to 5 µm, greater than or equal to 15 µm, greater than or equal to 20 µm, greater than or equal to 25 µm, greater than or equal to 30 µm, greater than or equal to 35 µm, greater than or equal to 40 µm, or greater than or equal to 45 µm, less than or equal to 50 µm, less than or equal to 45 µm, less than or equal to 40 µm, less than or equal to 35 µm, less than or equal to 30 µm, less than or equal to 25 µm, less than or equal to 20 µm, less than or equal to 15 µm, less than or equal to 10 µm, less than or equal to 5 µm, less than or equal to 3 µm, less than or equal to 2 µm, less than or equal to 1 µm, less than or equal to 0.7 µm, or less than or equal to 0.3 µm, and/or between 0.1 µm and 40 µm, between 0.1 µm and 30 µm, between 0.1 µm and 20 µm, between 0.1 µm and 10 µm, between 0.3 µm and 7 µm, between 0.3 µm and 7 µm, between 0.3 µm and 6 µm, between 0.3 µm and 5 µm, or between 0.3 µm and 4 µm.

In the field of application of augmented reality glasses, the aforementioned values of the bow may be provided in order to achieve a high strength.

Alternatively or additionally, it can also be provided that for the Young's modulus of the material of the substrate body, E, the Poisson's ratio of the material of the substrate body, v, the radius of curvature of the composite workpiece, in particular of the substrate body, R, the thickness of the substrate body, D, the thickness of the first coating, d, and for the compressive stress in the first coating S, the relation $$S = \frac{E}{1-v} \frac{D^2}{6Rd}$$

is valid, wherein the Young's modulus may have a value between 40 GPa and 160 GPa, for example between 85 GPa and 130 GPa, and/or the Poisson's ratio has a value between 0.15 and 0.35, for example between 0.2 and 0.3.

When the variables of the composite material and its constituents satisfy the aforementioned relationship, the improved strength properties of the substrate body against force acting on the second surface can be achieved for the field of application of the augmented reality glasses. Thus, the variables can be suitably selected in accordance with said provision in order to obtain advantageous products.

In some embodiments, for one or more of the variables from the group consisting of the Young's modulus of the material of the substrate body, E, the Poisson's ratio of the material of the substrate body, v, the radius of curvature of the composite workpiece, in particular of the substrate body, R, the thickness of the substrate body, D, the thickness of the first coating, d, and stress, such as in particular compressive stress, in the first coating, S, the ranges of values of these variables mentioned respectively in the description at the corresponding places can be used.

If, for example, $HfO_2$ is used instead of $TiO_2$ with suitable process parameters, a tensile stress may also be present and/or adjustable in the first coating. According to previously current understanding, a tensile stress in the first coating is linked to a compressive stress in the substrate body, which in turn has a positive effect on the surface strength of the substrate body, such as in particular glass.

Thus, the aforementioned relationship makes it particularly easy to determine suitable glasses for the substrate body. Thus, if a particular glass is to be used as a substrate body, the relationship can be used to check very easily whether, for given other variables, the glass can be used and/or how variables must be adjusted in order to be able to use an exemplary glass as a substrate body.

Here, the radius of curvature of the composite workpiece, in particular of the substrate body, R, may be specified in relation to the second surface of the composite workpiece.

Alternatively or additionally, the radius of curvature R can also be determined from the bow by using the following relationship:

$$R = \frac{0.25 \times X^2 + bow^2}{2 \times bow}$$

Thus, in other words, the radius of curvature "R" used in the "Stoney" formula can be calculated from the "bow" knowing the substrate diameter "X" and assuming a circular arc.

Alternatively or additionally, it may also be provided that the second surface is polished; that the first surface is polished; that the first surface of the substrate body is convexly shaped at least in the area of the first coating; and/or that the second surface of the substrate body is concavely shaped at least in the area of the first coating.

If the second surface is polished, the structures can be applied to the substrate particularly reliably.

It has been shown to be advantageous if the first coating is arranged specifically on convex areas of the first surface, so as to achieve a particularly good strength against forces acting on the second surface. For example, the first coating can also be arranged only on convex areas of the first surface. In some embodiments, the first surface is then convex everywhere and the entire first surface is coated with the first coating.

The areas of the second surface may be concave in shape, where the first coating is present opposite on the first surface, so as to achieve a particularly good strength. In some embodiments, then, the second surface is concave in shape everywhere.

Alternatively or additionally, it can also be provided that at least in the first surface and/or at least in a depth region of the substrate body under the first surface, for example in a depth of up to twice or three times the layer thickness of the first coating, there is a tensile stress at least in areas, wherein the absolute value of the tensile stress corresponds in particular approximately to the compressive stress in the first coating and/or is between 1 MPa and 100 MPa.

A corresponding tensile stress can actually increase the strength, in particular for forces acting on the second surface, in the present composite workpiece, contrary to the expectation according to which a tensile stress reduces the strength of a substrate.

Alternatively or additionally, it can also be provided that the composite workpiece, in particular the substrate body, has a circular or oval-shaped cut surface in at least one cutting plane, in particular the cut surface has a maximum diameter of less than or equal to 500 mm, less than or equal to 300 mm, less than or equal to 200 mm, less than or equal to 150 mm, and/or greater than or equal to 50 mm, greater than or equal to 100 mm, greater than or equal to 150 mm, greater than or equal to 200 mm, or greater than or equal to 300 mm.

For example, the cutting plane lies in a plane substantially parallel to the first and/or the second surface. "Substantially parallel" in this context may mean that the curvature of the two surfaces caused by the bow is disregarded to that extent and, for example, warp is also disregarded. This is because the deviations of the first and/or the second surface from planar or parallel first and second surfaces caused by bow, warp and/or other influences are significantly smaller, for example two, three, four or even more orders of magnitude smaller, than the substrate thickness.

Alternatively or additionally, it can also be provided that the composite workpiece further comprises a second coating, wherein at least the second surface of the substrate body is coated at least in areas with the second coating, wherein in particular the second coating is UV-curable, has an optical refractive index adapted to the material of the substrate body, and/or comprises a plastic, in particular a polymer, and/or comprises and/or forms at least one structure, such as a lattice structure, which can be applied or is applied to the substrate body, in particular at least partially by nano-imprint lithography, that only the second surface of the substrate body is coated with the second coating, and/or that the first surface of the substrate body is not coated with the second coating.

By coating the second surface with a second coating, it is particularly easy to provide the structure on the composite workpiece by the punch tool. In a sense, the punch can then simply reform the second coating to create the desired structure, such as a lattice structure.

This is very efficient, and makes it possible to provide a very widely pre-processed composite workpiece, which nevertheless still allows great freedom of design in terms of the structures ultimately desired.

Therefore, polymers are also particularly suitable as materials for the second coating.

The punch tool used, which exerts a force on the substrate body, in particular on the second surface, can be used here, for example, as part of the nano-imprint lithography process described further above. In this way, such a method for forming the structure can be used particularly efficiently and reliably with the proposed composite workpiece.

In some embodiments, the second coating is applied directly or indirectly to the second surface, at least in areas. When applied directly, the second coating is in direct contact with the second surface. When applied indirectly, the second coating has no direct contact with the second surface. In the latter case, for example, one or more intermediate layers, in particular fully or partially sandwiched, may be arranged between the second surface and the second coating, at least in areas. Optionally, the second coating is applied onto the second surface directly in areas and indirectly in areas.

The second coating only on the second surface or not on the first surface leads to very good results in increasing the strength.

In some embodiments, a plurality of previously described composite workpieces, in particular between 2 and 1,000,000, for example 25, 50, 100, 500, 1,000 or 10,000, are provided.

Thus, the advantages of the composite workpiece provided according to the invention can also be applied to entire production lines in which a plurality of composite workpieces are used in series and/or in parallel for further processing.

Alternatively or additionally, it can also be provided that the probability of failure for the composite workpieces when a force of 100 Newtons is applied to the second surface of the individual substrate bodies is less than or equal to 1%, for example less than or equal to 0.5% or 0.1%.

It has been found that the probability of failure for the majority of composite workpieces is particularly small.

Here, the probability of failure may be determined by the Weibull distribution. For this purpose, the force that may act on the second surface of the composite workpiece in areas until the composite workpiece is destroyed, in particular breaks, is determined. For example, this is determined by use of the "ring-on-ring" test method, which has already been described above. For example, the Weibull limit is 67% and/or the 67% probability of breakage is considered.

In some embodiments, for the composite workpiece, the force corresponding to the 67% Weibull limit, i.e. the Weibull force, is above 500 Newtons, for example above 600 Newtons or above 700 Newtons. Alternatively or additionally, the Weibull force is less than 2000 Newtons, for example less than 1500 Newtons, less than 1000 Newtons, less than 800 Newtons, or less than 700 Newtons. Alternatively or additionally, the Weibull force is between 500 Newtons and 2000 Newtons, for example between 600 Newtons and 1500 Newtons or between 600 Newtons and 1000 Newtons.

For example, if the destruction force is determined for 1,000 composite workpieces and for 2 composite workpieces thereof the destruction occurs at a force of 100 Newtons, the probability of failure or breakage for 100 Newtons is $2/1,000 \times 100$ percent=$2/10$ percent=0.2 percent=2 per mil.

In some embodiments, a method for producing a composite workpiece according to the invention is provided. The method comprises: providing a substrate body, in particular made of glass and/or according to the invention; applying a coating, in particular the first coating according to the invention, onto a surface of the substrate body, in particular the first surface according to the invention; and maintaining the substrate temperature at less than or equal to 200° C. at least temporarily or continuously during the application of the coating onto the surface of the substrate body.

Controlling the substrate temperature has proven to be advantageous because of thermal expansion. This is because the substrate body, in particular if it is made of glass, expands further because it has a larger coefficient of thermal expansion. If the substrate body becomes too hot, the bow becomes too large. By controlling the substrate temperature, a particularly resistant composite workpiece can be obtained.

A low compressive stress in the first coating has proven to be advantageous.

One solution to the aforementioned problem is therefore to reduce or even minimize the resulting compressive stress of the first coating. This can be achieved by a variety of process parameters during the manufacturing process of the composite workpiece. For example, it has been recognized to this extent that the coating temperature is an effective and also a very easy controllable parameter. The coefficient of thermal expansion (CTE) in the temperature range 20° C.-300° C. of most substrate bodies, especially glasses, is in the order of up to $20 \times 10^{-6}$/K, for example in the range of $3 \times 10^{-6}$/K up to $16 \times 10^{-6}$/K, or in the range of $7 \times 10^{-6}$/K up to $12 \times 10^{-6}$/K.

The "coefficient of thermal expansion" or "CTE" is the average linear coefficient of thermal expansion in a temperature range from 20° C. to 300° C. It is determined according to DIN ISO 7991:1987.

In case the CTE of the coating does not match the CTE of the substrate body, especially the glass, residual stresses will occur due to their difference when the coated substrate body cools down from the process temperature to ambient temperature. Therefore, during coating, the process temperature should be chosen high enough, e.g., at least 130° C., at most 300° C., and/or between 140° C. and 200° C., in order to obtain a well-functioning coating with sufficient density/low porosity and low absorption, i.e., ideally fully stoichiometric oxides.

In some embodiments, the first surface of the substrate body is reinforced by a chemical interaction in the interfacial region with the first coating. A mixing zone may be generated by diffusion and/or kinetic energy of the deposited atoms and/or may be driven by chemical interactions, each of which may result in compressive stress and/or healing of defects due to additional chemical bondings. Here, the penetration depth and strength of this reaction may be further optionally controlled by the chemical composition of the substrate body, its chemical and/or physical surface properties (such as roughness and/or leaching zone due to polishing processes) and/or by the energy, the ionization state and/or the chemical composition of the particles of the coating material of the first coating.

For example, the process may be designed as follows:

A substrate body, such as in particular a wafer, made of, for example, the material N-SF6 with a diameter of, for example, 200 mm and a thickness of, for example, 700 µm is measured with respect to its curvature, i.e. its bow. The result of the bow measurement provides a value of, for example, about 2 µm. Subsequently the wafer is cleaned, for example in a water bath of deionized water at, for example, 45° C. with ultrasonic assistance at, for example, 130 kHz for, for example, 250 seconds. The cleaned wafer is subsequently dried in air at 60° C. for, for example, 500 seconds. The surface treated in this way is largely free of particles.

For coating, the wafer is placed in a holder of the vapor deposition calotte of a vacuum coating system of the type Leybold APS1104, wherein in the present case the coating is applied to the convex side of the wafer. The equipment is further provided with the appropriate evaporation materials to be able to produce a layer containing $SiO_2$ and $TiO_2$: $SiO_2$ and $Ti_3O_5$. After closing the chamber door, evacuation of the process chamber is started. As soon as a base pressure of, for example, $1 \times 10^{-3}$ Pa is achieved, the coating process is started. For this purpose, the substrate heating is first switched on and a substrate temperature of, for example, 150° C. is selected. As soon as this temperature is reached, the deposition of the anti-reflective system is started. A first layer of $TiO_2$ with a layer thickness of, for example, 19 nm is deposited. This is followed by a layer of $SiO_2$ with a thickness of, for example, 35 nm, followed by a layer of $TiO_2$ with a thickness of, for example, 25 nm, and finally a layer of $SiO_2$ with a thickness of, for example, 109 nm. The coating rate is 2.0 Å/s, and the ion energy of the ion source is 50 eV.

After the coating process is finished, the substrate heating is switched off and the process chamber is ventilated. After removal of the coated substrate body, such as said wafer, a bow measurement is again performed. This time, it provides a value in terms of amount of, for example, 5 µm, wherein the type of deflection has not changed, i.e. the layer is still disposed on a convex-shaped surface.

Optionally, the additional bow applied by the coating can now be converted into a layer stress using the Stoney formula. For this purpose, for example, starting from an (assumed) perfectly flat substrate body, the radius of curvature caused by the coating can be determined with knowledge of the wafer geometry. In the present case, a compressive layer stress of approx. 32 MPa results.

The method may further comprise the step of post-processing the substrate body. For example, one or more cutting processes may be applied. In some embodiments, the method comprises one or more abrasive processes, in particular selected from grinding, lapping and polishing. This may be advantageous for achieving a very low Total Thickness Variation (TTV). Furthermore, the surface roughness may be specifically adjusted.

In some embodiments provided according to the invention, augmented reality glasses comprise at least one composite workpiece, or at least one blank thereof, provided according to the invention.

In some embodiments provided according to the invention, there is provided a use of a composite workpiece, or at least a blank thereof, according to the invention in augmented reality glasses.

A blank may be obtained, for example, in a very general manner by cutting, sawing and/or breaking the composite workpiece into a plurality of single parts. A blank is then one such single part. For example, a spectacles glass of augmented reality glasses may comprise or constitute such a single part or blank.

Further Options

Coating Layers

The "coating" herein may refer to the first coating.

A coating may comprise one or more coating layers. The coating layers may be arranged in a stack, wherein each coating layer extends parallel to the front surface.

An exemplary coating layer has a chemical composition that either does not vary through its interior or varies smoothly and continuously through its interior. An exemplary coating layer has either a homogeneous chemical composition or a smoothly and continuously varying chemical composition. An exemplary coating layer has a chemical composition in which the maximum local weight percentage of an element is less than 1.2, for example less than 1.1 or less than 1.05 times the minimum weight percentage of the element. This may be true for any element.

An exemplary coating layer has a refractive index that either does not vary through its interior or varies smoothly and continuously through its interior. An exemplary coating layer has either a homogeneous refractive index or a smoothly and continuously varying refractive index. An exemplary coating layer has a maximum local refractive index that is less than 1.2, for example less than 1.1 or less than 1.05 times the minimum local refractive index.

An exemplary coating layer has a constant thickness across its transverse extension. An exemplary coating layer has a ratio of the smallest thickness to the largest thickness in the range of 1:1 to 1:1.1, for example in the range of 1:1 to 1:1.05 or in the range of 1:1 to 1:1.01.

In some embodiments, the coating comprises one or more Group A coating layers. The group A coating layers have a refractive index of at least 1.7. An exemplary group A coating layer has a refractive index in the range of 1.70 to 2.60, for example in the range of 1.80 to 2.60, in the range of 1.90 to 2.50, or from 1.95 to 2.45. An exemplary Group A coating layer has a refractive index of at least 1.80, for example at least 1.90 or at least 1.95. An exemplary Group A coating layer has a refractive index up to 2.60, for example up to 2.50 or up to 2.45. An exemplary group A coating layer is made of a material selected from the group consisting of $Si_3N_4$, $ZrO_2$, $Ta_2O_5$, $HfO_2$, $Nb_2O_5$, $TiO_2$, $SnO_2$, indium tin oxide, $ZnO_2$, AN, a mixed oxide comprising at least one thereof, a mixed nitride comprising at least one thereof, and a mixed oxide nitride comprising at least one thereof for example made from a material selected from the group consisting of $ZrO_2$, $Ta_2O_5$, $HfO_2$, $Nb_2O_5$, $TiO_2$, and a mixed oxide comprising at least one thereof. In some embodiments, the coating layer is made of $ZrO_2$, or $HfO_2$. In some embodiments, the coating layer is made of $ZrO_2$, $TiO_2$, or $Nb_2O_5$. Exemplary mixed oxides include $TiO_2/SiO_2$, $Nb_2O_5/SiO_2$ and $ZrO_2/Y_2O_3$. An exemplary mixed nitride is AlSiN. An exemplary mixed oxynitride is AlSiON.

In some embodiments, the composite workpiece, in particular the coating such as the first coating, comprises two or more group A layers, wherein at least one pair of group A layers consists of different materials. In some embodiments, the composite workpiece, in particular the coating such as the first coating, comprises two or more group A layers, wherein all group A layers consist of the same material.

In some embodiments, the coating comprises one or more group B coating layers. The group B coating layers have a refractive index of at least 1.7. An exemplary group B coating layer has a refractive index in the range of 1.37 to 1.60, for example 1.37 to 1.55 or 1.38 to 1.50. An exemplary Group B coating layer has a refractive index of at least 1.37, for example at least 1.38. An exemplary Group B coating layer has a refractive index of up to 1.60, for example up to 1.55 or up to 1.50.

An exemplary Group B coating layer is made of a material selected from the group consisting of $SiO_2$, $MgF_2$, and a mixed oxide comprising $SiO_2$, and a further oxide. An exemplary mixed oxide in this context comprises $SiO_2$ and $Al_2O_3$. An exemplary mixed oxide in this context comprises $SiO_2$ in a range from 50 to 98 wt.-%, for example from 60 to 95 wt.-% or from 70 to 93 wt.-%. An exemplary mixed oxide in this context comprises $SiO_2$ up to 98 wt.-%, for example up to 95 wt.-% or up to 93 wt.-%. An exemplary mixed oxide in this context comprises at least 50 wt.-%, for example at least 60 wt.-% or at least 70 wt.-% $SiO_2$. An exemplary mixed oxide in this context comprises $SiO_2$ in the range from 50 to 98 wt.-%, for example from 60 to 95 wt.-% or from 70 to 93 wt.-%, and $Al_2O_3$ in the range from 2 to 50 wt.-%, for example from 5 to 40 wt.-% or from 7 to 30 wt.-%.

In some embodiments, the composite workpiece, in particular the coating such as the first coating, comprises two or more Group B layers, wherein at least one pair of Group B layers consists of different materials. In some embodiments, the layered optical composite material comprises two or more Group B layers, wherein all of the Group B layers consist of the same material.

In some embodiments, the coating structure is described in terms of type A and type B areas, wherein type A areas have a higher refractive index, and type B areas have a lower refractive index. So-called needle layers, which have a thickness of 5 nm or less, do not affect the nature of an area as type A or type B. The areas are characterized based on coating layers that have a thickness greater than 5 nm.

So-called needle layers can have a thickness as thin as 1 nm. A so-called needle layer could be as thin as an atomic monolayer.

In the following English-language description text, the following German/English translations are used in particular:
Verbundwerkstück—composite workpiece
Substratkörper—substrate body
(erste/zweite) Beschichtung—(first/second) coating
(erste/zweite) Oberfläche—(first/second) surface
(erste/zweite) Hauptfläche—(first/second) main surface
The following observations are each optionally noted:
A coating may act homogeneously to the whole surface such as the first surface of the substrate body, therefore it may influence the substrate body's bow. It may therefore be possible to compare the bow before and after coating to calculate the stress in the coating by Stoney's Equation.
The bow after coating may differ from the uncoated substrate body, such as glass, indicating some residual stress.
Using "Stoney's Equation" one might derive a stress of the pure anti reflex coating of only 20-30 MPa.
The absolute value of the bow may be extremely small compared to standard coatings, for example orders of 10 or more smaller.
There might be no or nearly no additional warp by the application of a single-side coating which might prove that the coating process minimizes the stress introduction.
There might be only very little bow contribution by the application of a single-side coating which might prove that the coating process minimizes the stress introduction.

Young's Modulus

Surprisingly it was found that a substrate body of high strength can be obtained by increasing the Young's modulus. In some embodiments, the substrate body, especially glass, provided according to the invention has a Young's modulus in the range from 40 GPa to 160 GPa, for example from 70 GPa to 150 GPa, from 80 GPa to 140 GPa, from 90 GPa to 100 GPa, from 40 GPa to 100 GPa, from 40 GPa to 110 GPa, from 100 to 140 GPa, from 120 GPa to 160 GPa, from 40 GPa to 80 GPa or from 85 GPa to 130 GPa.

Dimensions and Shape

In some embodiments, the refractive index n of the substrate body at a wavelength of 450 nm is in a range from 1.45 to 2.45, for example from 1.50 to 2.40, from 1.55 to 2.35, from 1.60 to 2.30, from 1.65 to 2.25, from 1.70 to 2.20, from 1.75 to 2.15, from 1.80 to 2.10, from 1.85 to 2.05, from 1.86 to 2.04, from 1.87 to 2.03, from 1.88 to 2.02, from 1.89 to 2.01, or from 1.90 to 2.10. In some embodiments, the refractive index n of the substrate body at a wavelength of 450 nm is in a range from 1.70 to 2.10.

In some embodiments, the substrate body provided according to the invention is a glass wafer. The substrate body may be a rectangular-shaped glass wafer, for example having a length in a range from 40 mm to 1,250 mm and a width from 30 mm to 750 mm. However, in some embodiments the substrate body is not rectangular-shaped but round-shaped, in particular a round-shaped glass wafer. A round-shaped glass wafer may also be described as disc-like glass wafer. In some embodiments, the substrate body is a disc-like glass wafer, such as a glass wafer having a diameter in the range from 100 mm to 500 mm, from 120 mm to 450 mm, from 140 mm to 400 mm, from 160 mm to 350 mm, from 180 mm to 325 mm, or from 200 mm to 300 mm. A diameter of about 200 mm or about 300 mm may be desired. In some embodiments, the diameter of the substrate body is at least 100 mm, at least 120 mm, at least 140 mm, at least 160 mm, at least 180 mm or at least 200 mm. In some embodiments, the diameter of the substrate body is at most 500 mm, at most 450 mm, at most 400 mm, at most 350 mm, at most 325 mm, or at most 300 mm.

In some embodiments, the substrate body is a glass wafer, in particular a planar glass wafer such as a planar waveguide. In some embodiments, the substrate body has two main surfaces. In some embodiments, the main surfaces have about the same surface area. In some embodiments, each main surface, especially the first and/or second surface, has a surface area (especially the area of the respective first and second surface) in the range from 1,000 to 1,000,000 mm², for example, from 3,000 to 750,000 mm², from 5,000 to 500,000 mm², for example from 10,000 to 400,000 mm², from 20,000 to 300,000 mm², from 30,000 to 200,000 mm², from 40,000 to 150,000 mm², from 50,000 to 125,000 mm², or from 60,000 to 100,000 mm².

In some embodiments, the thickness d of the substrate body is in a range from 0.10 mm to 2.0 mm, for example from 0.15 mm to 1.5 mm, from 0.20 mm to 1.2 mm, from 0.25 mm to 1.0 mm, from 0.30 mm to 0.70 mm, for example from 0.40 mm to 0.60 mm. Low thicknesses are advantageous with respect to the weight of the substrate body. However, there may be disadvantages regarding surface and geometrical properties that may impair light propagation based on total internal reflection, for example by increasing optical loss and/or dependence of optical loss from the propagation angle. Therefore, the above-indicated ranges are exemplary.

In some embodiments, the ratio of diameter, especially maximal diameter, and thickness of the substrate body is in a range from 200:1 to 2,000:1, for example from 350:1 to 1,500:1 or from 500:1 to 1,000:1.

The substrate body provided according to the invention may be a glass wafer, in particular a planar glass wafer such as a planar waveguide.

In some embodiments, the substrate body provided according to the invention has a low warp, in particular a warp of less than 100 µm, for example of less than 50 µm, or less than 20 µm. The warp may be more than 1 µm, more than 5 µm or more than 10 µm. In some embodiments, the composite workpiece, especially the substrate body, provided according to the invention has a low bow, in particular a bow of less than 50 µm, for example less than 30 µm or less than 20 µm. The bow may be more than 1 µm, more than 5 µm or more than 10 µm. Warp and/or bow of the composite workpiece, especially the substrate body, may be influenced by diameter and thickness of the substrate body as well as by coatings, such as the first coating. In some embodiments, warp and/or bow of the composite workpiece, especially the substrate body, provided according to the invention are less than 0.1% of the substrate body's diameter, for example less than 0.075% of the substrate body's diameter, less than 0.05% of the substrate body's diameter, less than 0.025% of the substrate body's diameter, or less than 0.01% of the substrate body's diameter. Warp and/or bow may be more than 0.001% of the substrate body's diameter, more than 0.002% of the substrate body's diameter or more than 0.005% of the substrate body's diameter. In some embodiments, warp and bow are determined according to SEMI3D1203152015.

In some embodiments, the TTV (Total Thickness Variation) of the substrate body is smaller than 2 µm, for example smaller than 1.8 µm, smaller than 1.6 µm, smaller than 1.5 µm, smaller than 1.4 µm, smaller than 1.3 µm, smaller than 1.2 µm, smaller than 1.1 µm, smaller than 1.0 µm, smaller than 0.75 µm, or smaller than 0.5 TTV may be determined based on SEMI MF 1530GBIR. TTV may also be determined based on interferometric measurements of the thickness profile of the substrate body, for example using an interferometer, in particular an interferometer of Zygo Corporation. In some embodiments, TTV may be at least 0.1 µm or at least 0.2 µm. A very low TTV may be advantageous for use of the substrate body in the AR field. A low TTV may, for example, be obtained by abrasive processes such as grinding, lapping and/or polishing. Thus, the substrate body provided according to the invention may be a substrate body that an abrasive process has been applied to.

Surface Roughness

In some embodiments, the substrate body, especially the first and/or second surface, has a surface roughness $R_q$ in a range from 0.1 nm to 5 nm, for example from 0.15 nm to 3.5 nm, from 0.2 nm to 2 nm, from 0.25 nm to 1.5 nm, from 0.3 nm to 1.0 nm, or from 0.35 nm to 0.75 nm. In some embodiments, the surface roughness $R_q$ is less than 5 nm, for example less than 3.5 nm, less than 2 nm, less than 1.5 nm, less than 1.0 nm, less than 0.75 nm, or less than 0.5 nm. A low surface roughness $R_q$ may be advantageous for obtaining a higher strength, especially surface strength. Surface roughness $R_q$ may be determined with white light interferometry (WLI) or atomic force microscopy (AFM). In the present disclosure, the terms "$R_q$" and "RMS" are used interchangeably. Surface roughness $R_q$ may be determined according to DIN EN ISO 4287.

In some embodiments, the substrate body, especially the first and/or second surface, has a surface roughness $R_a$ in a range from 0.1 nm to 5 nm, for example from 0.15 nm to 3.5 nm, from 0.2 nm to 2 nm, from 0.25 nm to 1.5 nm, from 0.3 nm to 1.0 nm, or from 0.35 nm to 0.75 nm. In some embodiments, the surface roughness $R_a$ is less than 5 nm, for example less than 3.5 nm, less than 2 nm, less than 1.5 nm, less than 1.0 nm, less than 0.75 nm, or less than 0.5 nm. A low surface roughness $R_a$ may be advantageous for obtaining a higher strength, especially surface strength. Surface roughness $R_a$ may be determined according to ISO DIN EN ISO 4287.

Glass Compositions

The substrate body provided according to the present invention may comprise glass or may be made of glass. The substrate body is not restricted to particular glass compositions. Exemplary composition ranges are presented in the following as mere examples.

The amount of $SiO_2$ in the substrate body provided according to the invention may be in a range from 0 to 80 wt.-%, for example at most 70 wt.-%, at most 60 wt.-% or at most 15 wt.-%. In some embodiments, the amount of $SiO_2$ is at least 10 wt.-%, at least 20 wt.-%, at least 30 wt.-% or at least 40 wt.-%. In some embodiments, the amount of $SiO_2$ is less than 20 wt.-% or even less than 10 wt.-%.

The amount of $P_2O_5$ in the substrate body provided according to the invention may be in a range from 0 to 40 wt.-%, for example at most 30 wt.-%, at most 5 wt.-% or at most 2 wt.-%. In some embodiments, the amount of $P_2O_5$ may be at least 10 wt.-%, at least 15 wt.-% or at least 20 wt.-%. In some embodiments, the amount of $P_2O_5$ is at most 1 wt.-%, or at most 0.5 wt.-%. The substrate body provided according to the invention may also be free of $P_2O_5$.

The amount of $Al_2O_3$ in the substrate body provided according to the invention may be in a range from 0 to 25 wt.-%, for example at most 15 wt.-%, at most 10 wt.-%, or at most 5 wt.-%. In some embodiments, the amount of $Al_2O_3$ may be at least 0.1 wt.-%, at least 0.5 wt.-% or at least 1 wt.-%. In some embodiments, the amount of $Al_2O_3$ is at most 1 wt.-% or at most 0.5 wt.-%. The substrate body provided according to the invention may also be free of $Al_2O_3$.

The amount of $B_2O_3$ in the substrate body provided according to the invention may be in a range from 0 to 55 wt.-%, for example at most 45 wt.-%, at most 35 wt.-%, or at most 25 wt.-%. In some embodiments, the amount of $B_2O_3$ may be at least 1 wt.-%, at least 2 wt.-%, or at least 5 wt.-%. In some embodiments, the amount of $B_2O_3$ is at most 20 wt.-%, at most 15 wt.-% or at most 10 wt.-%. The substrate body provided according to the invention may also be free of $B_2O_3$.

The amount of $Li_2O$ in the substrate body provided according to the invention may be in a range from 0 to 10 wt.-%, for example at most 5 wt.-%, at most 2 wt.-%, or at most 1 wt.-%. In some embodiments, the amount of $Li_2O$ may be at least 0.5 wt.-%, at least 1 wt.-%, or at least 2 wt.-%. In some embodiments, the amount of $Li_2O$ is at most 0.5 wt.-%, at most 0.2 wt.-% or at most 0.1 wt.-%. The substrate body provided according to the invention may also be free of $Li_2O$.

The amount of $Na_2O$ in the substrate body provided according to the invention may be in a range from 0 to 30 wt.-%, for example at most 25 wt.-%, at most 20 wt.-%, at most 10 wt.-%, or at most 5 wt.-%. In some embodiments, the amount of $Na_2O$ may be at least 1 wt.-%, at least 2 wt.-%, or at least 5 wt.-%. In some embodiments, the amount of $Na_2O$ is at most 2 wt.-%, at most 1 wt.-% or at most 0.5 wt.-%. The substrate body provided according to the invention may also be free of $Na_2O$.

The amount of $K_2O$ in the substrate body provided according to the invention may be in a range from 0 to 25 wt.-%, for example at most 20 wt.-%, at most 10 wt.-%, or at most 5 wt.-%. In some embodiments, the amount of $K_2O$ may be at least 1 wt.-%, at least 2 wt.-%, or at least 5 wt.-%. In some embodiments, the amount of $K_2O$ is at most 2 wt.-%, at most 1 wt.-% or at most 0.5 wt.-%. The substrate body provided according to the invention may also be free of $K_2O$.

The amount of MgO in the substrate body provided according to the invention may be in a range from 0 to 10 wt.-%, for example at most 5 wt.-%, at most 2 wt.-%, or at most 1 wt.-%. In some embodiments, the amount of MgO may be at least 0.5 wt.-%, at least 1 wt.-%, or at least 2 wt.-%. In some embodiments, the amount of MgO is at most 0.5 wt.-%, at most 0.2 wt.-% or at most 0.1 wt.-%. The substrate body provided according to the invention may also be free of MgO.

The amount of CaO in the substrate body provided according to the invention may be in a range from 0 to 40 wt.-%, for example at most 30 wt.-%, at most 25 wt.-%, or at most 15 wt.-%. In some embodiments, the amount of CaO may be at least 1 wt.-%, at least 5 wt.-%, or at least 10 wt.-%. In some embodiments, the amount of CaO is at most 10 wt.-%, at most 5 wt.-%, or at most 1 wt.-%. The substrate body provided according to the invention may also be free of CaO.

The amount of SrO in the substrate body provided according to the invention may be in a range from 0 to 25 wt.-%, for example at most 15 wt.-%, at most 10 wt.-%, or at most 5 wt.-%. In some embodiments, the amount of SrO may be at least 0.5 wt.-%, at least 1 wt.-%, or at least 2 wt.-%. In some embodiments, the amount of SrO is at most 2 wt.-%, at most 1 wt.-%, or at most 0.5 wt.-%. The substrate body provided according to the invention may also be free of SrO.

The amount of BaO in the substrate body provided according to the invention may be in a range from 0 to 55 wt.-%, for example at most 30 wt.-%, at most 20 wt.-%, or at most 10 wt.-%. In some embodiments, the amount of BaO may be at least 1 wt.-%, at least 5 wt.-%, or at least 10 wt.-%. In some embodiments, the amount of BaO is at most 5 wt.-%, at most 2 wt.-%, or at most 1 wt.-%. The substrate body provided according to the invention may also be free of BaO.

The amount of ZnO in the substrate body provided according to the invention may be in a range from 0 to 30 wt.-%, for example at most 20 wt.-%, at most 15 wt.-%, or at most 10 wt.-%. In some embodiments, the amount of ZnO may be at least 1 wt.-%, at least 2 wt.-%, or at least 5 wt.-%. In some embodiments, the amount of ZnO is at most 5 wt.-%, at most 2 wt.-%, or at most 1 wt.-%. The substrate body provided according to the invention may also be free of ZnO.

The amount of $La_2O_3$ in the substrate body provided according to the invention may be in a range from 0 to 55 wt.-%, for example at most 50 wt.-%, at most 40 wt.-%, or at most 20 wt.-%. In some embodiments, the amount of $La_2O_3$ may be at least 5 wt.-%, at least 10 wt.-%, or at least 20 wt.-%. In some embodiments, the amount of $La_2O_3$ is at most 10 wt.-%, at most 5 wt.-%, or at most 1 wt.-%. The substrate body provided according to the invention may also be free of $La_2O_3$.

The amount of $Gd_2O_3$ in the substrate body provided according to the invention may be in a range from 0 to 20 wt.-%, for example at most 15 wt.-%, at most 10 wt.-%, or at most 5 wt.-%. In some embodiments, the amount of $Gd_2O_3$ may be at least 1 wt.-%, at least 2 wt.-%, or at least 5 wt.-%. In some embodiments, the amount of $Gd_2O_3$ is at most 5 wt.-%, at most 2 wt.-%, or at most 1 wt.-%. The substrate body provided according to the invention may also be free of $Gd_2O_3$.

The amount of $Y_2O_3$ in the substrate body provided according to the invention may be in a range from 0 to 20 wt.-%, for example at most 15 wt.-%, at most 10 wt.-%, or at most 5 wt.-%. In some embodiments, the amount of $Y_2O_3$ may be at least 0.1 wt.-%, at least 0.2 wt.-%, or at least 0.5 wt.-%. In some embodiments, the amount of $Y_2O_3$ is at most 2 wt.-%, at most 1 wt.-%, or at most 0.5 wt.-%. The substrate body provided according to the invention may also be free of $Y_2O_3$.

The amount of $ZrO_2$ in the substrate body provided according to the invention may be in a range from 0 to 20 wt.-%, for example at most 15 wt.-%, at most 10 wt.-%, or at most 5 wt.-%. In some embodiments, the amount of $ZrO_2$ may be at least 1 wt.-%, at least 2 wt.-%, or at least 5 wt.-%. In some embodiments, the amount of $ZrO_2$ is at most 7.5 wt.-%, at most 5 wt.-%, or at most 2.5 wt.-%. The substrate body provided according to the invention may also be free of $ZrO_2$.

The amount of $TiO_2$ in the substrate body provided according to the invention may be in a range from 0 to 35 wt.-%, for example at most 30 wt.-%, at most 20 wt.-%, or at most 15 wt.-%. In some embodiments, the amount of $TiO_2$ may be at least 2 wt.-%, at least 5 wt.-%, or at least 10 wt.-%. In some embodiments, the amount of $TiO_2$ is at most 10 wt.-%, at most 7.5 wt.-%, or at most 5 wt.-%. The substrate body provided according to the invention may also be free of $TiO_2$.

The amount of $Ta_2O_5$ in the substrate body provided according to the invention may be in a range from 0 to 30 wt.-%, for example at most 25 wt.-%, at most 17.5 wt.-%, or at most 10 wt.-%. In some embodiments, the amount of $Ta_2O_5$ may be at least 1 wt.-%, at least 2 wt.-%, or at least 5 wt.-%. In some embodiments, the amount of $Ta_2O_5$ is at most 5 wt.-%, at most 2 wt.-%, or at most 1 wt.-%. The substrate body provided according to the invention may also be free of $Ta_2O_5$.

The amount of $Nb_2O_5$ in the substrate body provided according to the invention may be in a range from 0 to 55 wt.-%, for example at most 35 wt.-%, at most 20 wt.-%, or at most 15 wt.-%. In some embodiments, the amount of $Nb_2O_5$ may be at least 2 wt.-%, at least 5 wt.-%, or at least 10 wt.-%. In some embodiments, the amount of $Nb_2O_5$ is at most 10 wt.-%, at most 5 wt.-%, or at most 2 wt.-%. The substrate body provided according to the invention may also be free of $Nb_2O_5$.

The amount of $WO_3$ in the substrate body provided according to the invention may be in a range from 0 to 10 wt.-%, for example at most 7.5 wt.-%, at most 5 wt.-%, or at most 2 wt.-%. In some embodiments, the amount of $WO_3$ may be at least 0.1 wt.-%, at least 0.2 wt.-%, or at least 0.5 wt.-%. In some embodiments, the amount of $WO_3$ is at most 1 wt.-%, at most 0.5 wt.-%, or at most 0.2 wt.-%. The substrate body provided according to the invention may also be free of $WO_3$.

The amount of $Bi_2O_3$ in the substrate body provided according to the invention may be in a range from 0 to 65 wt.-%, for example at most 50 wt.-%, at most 20 wt.-%, or at most 10 wt.-%. In some embodiments, the amount of $Bi_2O_3$ may be at least 1 wt.-%, at least 2 wt.-%, or at least 5 wt.-%. In some embodiments, the amount of $Bi_2O_3$ is at most 5 wt.-%, at most 1 wt.-%, or at most 0.1 wt.-%. The substrate body provided according to the invention may be free of $Bi_2O_3$.

The amount of F in the substrate body provided according to the invention may be in a range from 0 to 45 wt.-%, for example at most 25 wt.-%, at most 10 wt.-%, or at most 5 wt.-%. In some embodiments, the amount of F may be at least 0.1 wt.-%, at least 0.5 wt.-%, or at least 1 wt.-%. In some embodiments, the amount of F is at most 2 wt.-%, at most 1 wt.-%, or at most 0.1 wt.-%. The substrate body provided according to the invention may be free of F.

The amount of $GeO_2$ in the substrate body provided according to the invention may be in a range from 0 to 20 wt.-%, for example at most 15 wt.-%, at most 10 wt.-%, or at most 5 wt.-%. In some embodiments, the amount of $GeO_2$ may be at least 0.1 wt.-%, at least 0.5 wt.-%, or at least 1 wt.-%. In some embodiments, the amount of $GeO_2$ is at most 2 wt.-%, at most 1 wt.-%, or at most 0.1 wt.-%. The substrate body provided according to the invention may be free of $GeO_2$.

The amount of PbO in the substrate body provided according to the invention may be in a range from 0 to 80 wt.-%, for example at most 70 wt.-%, at most 50 wt.-%, or at most 20 wt.-%. In some embodiments, the amount of PbO may be at least 1 wt.-%, at least 2 wt.-%, or at least 5 wt.-%. In some embodiments, the amount of PbO is at most 5 wt.-%, at most 1 wt.-%, or at most 0.1 wt.-%. The substrate body provided according to the invention may be free of PbO in particular in view of the toxicity and environmental harmfulness thereof.

In some embodiments, the substrate body provided according to the invention comprises (or essentially consists of) the following components in the indicated ranges (in wt.-%):

| Component | Amount (wt.-%) |
|---|---|
| $SiO_2$ | 0-80 |
| $P_2O_5$ | 0-40 |
| $Al_2O_3$ | 0-25 |
| $B_2O_3$ | 0-55 |
| $Li_2O$ | 0-10 |
| $Na_2O$ | 0-25 |
| $K_2O$ | 0-25 |
| MgO | 0-10 |
| CaO | 0-30 |
| SrO | 0-25 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-55 |
| $WO_3$ | 0-10 |
| $GeO_2$ | 0-20 |
| $Bi_2O_3$ | 0-65 |
| PbO | 0-80 |
| F | 0-45 |

In some embodiments, the substrate body provided according to the invention comprises (or essentially consists of) the following components in the indicated ranges (in wt.-%):

| Component | Amount (wt.-%) |
|---|---|
| $SiO_2$ | 0-80 |
| $P_2O_5$ | 0-30 |
| $Al_2O_3$ | 0-15 |
| $B_2O_3$ | 0-55 |
| $Li_2O$ | 0-10 |
| $Na_2O$ | 0-25 |
| $K_2O$ | 0-25 |
| MgO | 0-5 |
| CaO | 0-30 |
| SrO | 0-10 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-55 |
| $WO_3$ | 0-10 |
| $GeO_2$ | essentially free of |
| $Bi_2O_3$ | essentially free of |
| PbO | 0-70 |
| F | 0-25 |

In some embodiments, the substrate body provided according to the invention comprises (or essentially consists of) the following components in the indicated ranges (in wt.-%):

| Component | Amount (wt.-%) |
|---|---|
| $SiO_2$ | 0-80 |
| $P_2O_5$ | 0-5 |

| Component | Amount (wt.-%) |
|---|---|
| $Al_2O_3$ | 0-10 |
| $B_2O_3$ | 0-45 |
| $Li_2O$ | 0-10 |
| $Na_2O$ | 0-20 |
| $K_2O$ | 0-20 |
| MgO | 0-5 |
| CaO | 0-30 |
| SrO | 0-10 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-35 |
| $WO_3$ | 0-10 |
| $GeO_2$ | essentially free of |
| $Bi_2O_3$ | essentially free of |
| PbO | essentially free of |
| F | 0-5 |

In some embodiments, the substrate body provided according to the invention comprises (or essentially consists of) the following components in the indicated ranges (in wt.-%):

| Component | Amount (wt.-%) |
|---|---|
| $SiO_2$ | 0-60 |
| $P_2O_5$ | 0-2 |
| $Al_2O_3$ | 0-5 |
| $B_2O_3$ | 0-45 |
| $Li_2O$ | 0-10 |
| $Na_2O$ | 0-10 |
| $K_2O$ | 0-10 |
| MgO | 0-5 |
| CaO | 0-30 |
| SrO | 0-10 |
| BaO | 0-30 |
| ZnO | 0-30 |
| $La_2O_3$ | 0-55 |
| $Gd_2O_3$ | 0-20 |
| $Y_2O_3$ | 0-20 |
| $ZrO_2$ | 0-15 |
| $TiO_2$ | 0-20 |
| $Ta_2O_5$ | 0-25 |
| $Nb_2O_5$ | 0-20 |
| $WO_3$ | 0-5 |
| $GeO_2$ | essentially free of |
| $Bi_2O_3$ | essentially free of |
| PbO | essentially free of |
| F | essentially free of |

In some embodiments, the substrate body provided according to the invention comprises (or essentially consists of) the following components in the indicated ranges (in wt.-%):

| Component | Amount (wt.-%) |
|---|---|
| $SiO_2$ | 0-15 |
| $P_2O_5$ | essentially free of |
| $Al_2O_3$ | essentially free of |
| $B_2O_3$ | 0-45 |
| $Li_2O$ | essentially free of |
| $Na_2O$ | essentially free of |
| $K_2O$ | essentially free of |
| MgO | essentially free of |
| CaO | 0-15 |
| SrO | 0-5 |
| BaO | 0-10 |
| ZnO | 0-30 |
| $La_2O_3$ | 0-55 |
| $Gd_2O_3$ | 0-20 |
| $Y_2O_3$ | 0-20 |
| $ZrO_2$ | 0-10 |
| $TiO_2$ | 0-15 |
| $Ta_2O_5$ | 0-10 |
| $Nb_2O_5$ | 0-15 |
| $WO_3$ | 0-5 |
| $GeO_2$ | essentially free of |
| $Bi_2O_3$ | essentially free of |
| PbO | essentially free of |
| F | essentially free of |

Rare earth metal oxides such as $Yb_2O_3$, $CeO_2$, $Nd_2O_3$, $Lu_2O_3$ or $Gd_2O_3$ may alternatively or in addition also be comprised in an amount of 0 to 5 mol % to add magnetic or photonic or optical functions to the glass of the substrate body. In some embodiments, the glass of the substrate body is free of those components.

Some transition metal oxides may be comprised in the glass of the substrate body provided according to the invention alternatively or in addition, such as $Fe_2O_3$, CoO, NiO, $V_2O_5$, $MnO_2$, CuO, and $Cr_2O_3$, or a mixture of two or more thereof, which work as coloring agents to make glass with specific optical or photonic functions, for example, color filter or light convertor.

Examples

Referring now to the drawings, FIG. 1 shows a cross-sectional view of a composite workpiece 1 provided according to the invention. The composite workpiece 1 rests on a planar subsurface 3 and comprises a substrate body 5 and a first coating 7. A first surface 9 of the substrate body 1 is coated with the first coating 7 over its entire surface.

The first surface 9 is convexly curved, as can be seen from the cross-sectional view of FIG. 1. A second surface 11 of the substrate body 1 is disposed opposite the first surface 9 and is concavely curved.

As a result of the curvature of the first and second surfaces 9 and 11, the composite workpiece 1 comprise a bow and is therefore not in contact with the subsurface 3 throughout. The bow is between 0.1 μm and 50 μm.

Figure 2:
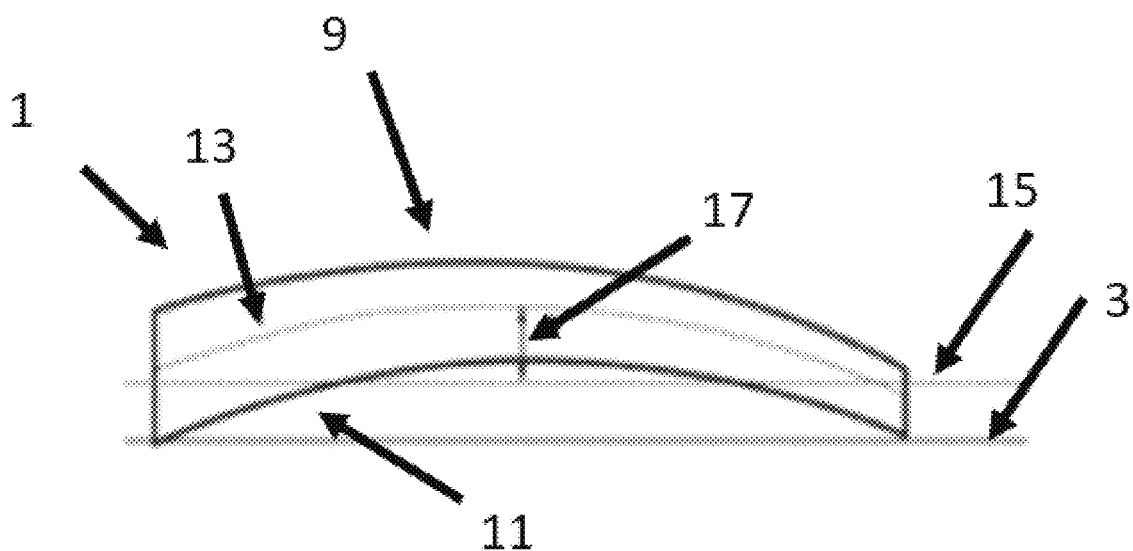
FIG. 2 shows an illustration for determining the bow of the composite workpiece of FIG. 1.

The bow is illustrated in FIG. 2.

Compared to the illustration in FIG. 1, the composite workpiece 1 is shown rotated by 180° so that the convex side now faces upwards.

Compared to the imaginary median surface 15 of the hypothetically non-curved composite workpiece 1, the median surface 13 of the composite workpiece 1 comprises a bow 17, which is measured according to SEMI 3D12-0315 2015.

In this case, the subsurface 3 is a three-point reference plane.

For clarity, the substrate body 5 and the first coating 7 of the composite workpiece 1 are not explicitly shown in FIG. 2.

Figure 3:
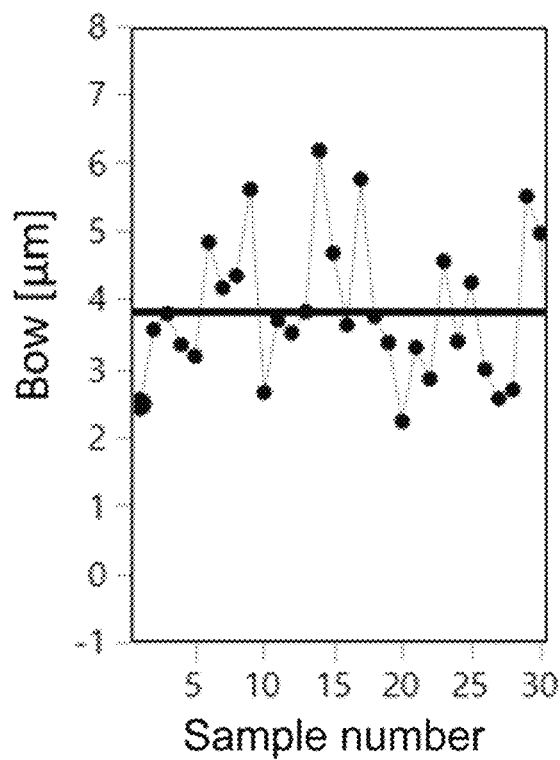
FIG. 3 shows a diagram including the determined bows of composite workpieces of a plurality of composite workpieces provided according to the invention.

FIG. 3 shows a diagram with the determined values for the bows of 30 composite workpieces. Each composite workpiece can be, for example, a composite workpiece such as the composite workpiece 1 of FIG. 1.

Here, the bows determined range between 2 μm and 6.2 μm. The mean value of all bows of the 30 composite workpieces examined is 3.9 μm and is marked by a horizontal line drawn in the diagram.

Figure 4:
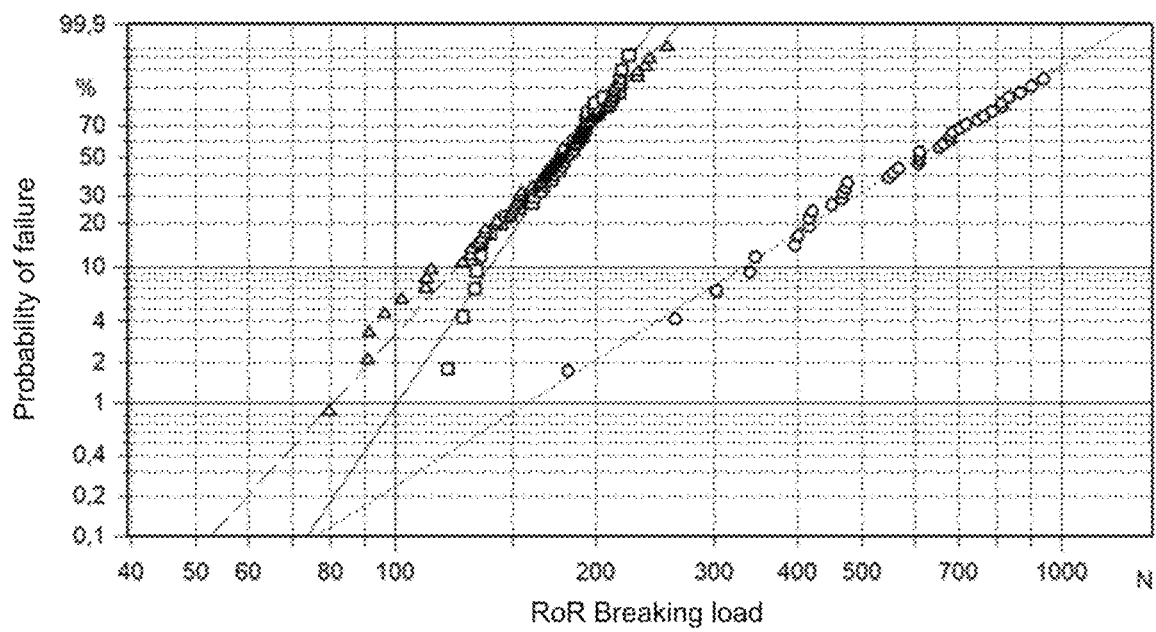
FIG. 4 shows a diagram including determined strength values of composite workpieces provided according to the invention and not according to the invention.

FIG. 4 shows the determined strength values for different composite workpieces.

For each composite workpiece, the strength of one surface of the composite workpiece was determined by use of the ring-on-ring test method.

The dotted line is obtained for a first plurality of composite workpieces as a regression line from the individual measured values of the strengths shown as circles. Each composite workpiece thereof is a composite workpiece provided according to the invention. Here, the force acted on the second, concavely curved surface, i.e. the one opposite the first surface coated with the first coating.

The solid line is obtained for a second plurality of composite workpieces as a regression line from the individual measured values of the strengths shown as squares. Each composite workpiece thereof is a composite workpiece provided according to the invention. Here, the force acted on the first, convexly curved, surface, i.e. the one opposite the one coated with the first coating (and thus opposite the uncoated second surface).

The dashed line is obtained for a third plurality of composite workpieces as a regression line from the individual measured values of the strengths shown as triangles. Each composite workpiece thereof is a composite workpiece not according to the invention that comprises a curved substrate body but no first coating. The force was applied to the second, concavely curved, surface, i.e. the one opposite the uncoated first surface.

The breaking force in Newtons plotted on the abscissa in the diagram is a very good comparative measure for the strength of a composite workpiece, such as the composite workpiece provided according to the invention. The diagram also shows the probability of failure in percent on the ordinate.

The diagram thus reads in such a way that the probability that the composite workpiece will break can be read for an applied force. In this case, the acting force is the breaking force.

It can be seen from the diagram that when force is applied to the second surface of a composite workpiece provided according to the invention (cf. the circles), the strength is significantly higher than in the case when the force is applied to the first surface of the composite workpiece provided according to the invention (cf. the squares) or to the second surface of the composite workpiece not according to the invention (cf. the triangles). That is, the composite workpiece breaks at lower forces when the force acts on the first surface of the composite workpiece provided according to the invention or on the second surface of the composite workpiece not according to the invention.

Thus, for example, it can be seen from the diagram that for a force of approximately 180 Newtons, there is a probability of failure of almost 2% for the composite workpiece provided according to the invention when the force acts on the second surface.

On the other hand, for the same force acting on the first surface of a composite workpiece provided according to the invention or on the second surface of a composite workpiece not according to the invention, there is a probability of failure of almost 50%.

This means that out of 100 composite workpieces, only 2 will break if the composite workpiece is one provided according to the invention and a force of 180 Newtons acts on the side opposite the coated side. A good half of the composite workpieces break when a force is applied to the coated side or when no coating is applied and a force is applied to the concavely curved surface.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE SYMBOLS 1 composite workpiece
3 subsurface
5 substrate body
7 coating
9 surface
11 surface
13 median surface
15 median surface
17 bow

What is claimed is:

1. A composite workpiece, comprising:
a substrate body comprising at least one first surface and at least one second surface, the at least one first surface of the substrate body being shaped convexly at least in areas and the at least one second surface of the substrate body being shaped concavely at least in areas, and the composite workpiece has a bow with an absolute value of between 0.1 μm and 50 μm due to the curved shape of the at least one first surface and the at least one second surface; and
a first coating, the at least one first surface of the substrate body being coated at least in areas with the first coating, wherein for a Young's modulus of a material of the substrate body (E), a Poisson's ratio of the material of the substrate body (v), a radius of curvature of the composite workpiece (R), a thickness of the substrate body (D), a thickness of the first coating (d), and for a compressive stress in the first coating(S), the relation $$S = \frac{E}{1-v}\frac{D^2}{6Rd}$$

is satisfied.

2. The composite workpiece of claim 1, wherein the substrate body is a wafer.

3. The composite workpiece of claim 1, wherein the substrate body has the bow.

4. The composite workpiece of claim 1, wherein the first coating at least one of:
  (i) comprises an anti-reflective coating;
  (ii) comprises at least one of: (a) $Si_3N_4$, $ZrO_2$, $Ta_2O_5$, $HfO_2$, $Nb_2O_5$, $TiO_2$, $SnO_2$, indium tin oxide, $ZnO_2$, AlN, a mixed oxide comprising at least one thereof, a mixed nitride comprising at least one thereof, or a mixed oxide nitride comprising at least one thereof, (b) $ZrO_2$, $Ta_2O_5$, $HfO_2$, $Nb_2O_5$, $TiO_2$, or a mixed oxide comprising at least one thereof, or (c) $SiO_2$, $MgF_2$, and a mixed oxide comprising $SiO_2$ and another oxide;

(iii) is applicable or applied onto the substrate body by at least one of a vapor deposition process or a sputtering process;
(iv) is amorphous; or
(v) has a thickness of at least one of less than or equal to 400 nm, less than or equal to 350 nm, less than or equal to 300 nm, less than or equal to 250 nm, less than or equal to 200 nm, less than or equal to 150 nm, less than or equal to 100 nm, less than or equal to 50 nm, greater than or equal to 50 nm, greater than or equal to 100 nm, greater than or equal to 150 nm, greater than or equal to 200 nm, greater than or equal to 250 nm, or greater than or equal to 300 nm;
wherein at least one of the following is satisfied:
only the at least one first surface of the substrate body is coated with the first coating; or
the at least one second surface of the substrate body is not coated with the first coating.

5. The composite workpiece of claim 1, wherein at least one of the following is satisfied:
the substrate body comprises glass; or
the substrate body has a thickness of at least one of: less than or equal to 2 mm, less than or equal to 1.5 mm, less than or equal to 1 mm, less than or equal to 0.5 mm, greater than or equal to 0.05 mm, greater than or equal to 0.07 mm, greater than or equal to 0.1 mm, greater than or equal to 0.3 mm, greater than or equal to 0.5 mm, greater than or equal to 1 mm, between 0.05 mm and 2 mm, between 0.07 mm and 2 mm, between 0.1 mm and 2 mm, between 0.3 mm and 2 mm, between 0.3 mm and 1.5 mm, or between 0.3 mm and 1 mm.

6. The composite workpiece of claim 1, wherein at least one of the following is satisfied:
(i) a strength of a first coated surface of the substrate body is greater than or equal to a strength of an uncoated second surface of the substrate body;
(ii) the at least one second surface withstands a greater force than the at least one first surface; or
(iii) the strength of at least one of the at least one first surface or the at least one second surface of the substrate body is at least one of greater than or equal to 100 MPa, greater than or equal to 150 MPa, greater than or equal to 200 MPa, greater than or equal to 250 MPa, less than or equal to 1000 MPa, less than or equal to 500 MPa, less than or equal to 400 MPa, less than or equal to 300 MPa, or less than or equal to 200 MPa.

7. The composite workpiece of claim 1, wherein there is a compressive stress in the first coating at least in areas.

8. The composite workpiece of claim 7, wherein the compressive stress is at least one of:
less than or equal to 100 MPa, less than or equal to 70 MPa, less than or equal to 50 MPa, less than or equal to 30 MPa, less than or equal to 20 MPa, less than or equal to 10 MPa, greater than or equal to 1 MPa, greater than or equal to 10 MPa, greater than or equal to 20 MPa, greater than or equal to 30 MPa, greater than or equal to 50 MPa, greater than or equal to 70 MPa, greater than or equal to 100 MPa, between 10 MPa and 50 MPa, between 15 MPa and 40 MPa, between 15 MPa and 30 MPa, between 15 MPa and 25 MPa, or between 20 MPa and 30 MPa.

9. The composite workpiece of claim 1, wherein the bow is at least one of:
greater than or equal to 0.3 µm, greater than or equal to 0.5 µm, greater than or equal to 1 µm, greater than or equal to 5 µm, greater than or equal to 15 µm, greater than or equal to 20 µm, greater than or equal to 25 µm, greater than or equal to 30 µm, greater than or equal to 35 µm, greater than or equal to 40 µm, greater than or equal to 45 µm, less than or equal to 50 µm, less than or equal to 45 µm, less than or equal to 40 µm, less than or equal to 35 µm, less than or equal to 30 µm, less than or equal to 25 µm, less than or equal to 20 µm, less than or equal to 15 µm, less than or equal to 10 µm, less than or equal to 5 µm, less than or equal to 3 µm, less than or equal to 2 µm, less than or equal to 1 µm, less than or equal to 0.7 µm, less than or equal to 0.3 µm, between 0.1 µm and 40 µm, between 0.1 µm and 30 µm, between 0.1 µm and 20 µm, between 0.1 µm and 10 µm, between 0.3 µm and 7 µm, between 0.3 µm and 7 µm, between 0.3 µm and 6 µm, between 0.3 µm and 5 µm, or between 0.3 µm and 4 µm.

10. The composite workpiece of claim 1, wherein at least one of the following is satisfied:
the Young's modulus has a value between 40 GPa and 160 GPa; or
the Poisson's ratio has a value between 0.15 and 0.35.

11. The composite workpiece of claim 1, wherein at least one of the following is satisfied:
the at least one second surface is polished;
the at least one first surface is polished;
the at least one first surface of the substrate body is convexly shaped at least in the area of the first coating; or
the at least one second surface of the substrate body is concavely shaped at least in the area of the first coating.

12. The composite workpiece of claim 1, wherein at least in at least one of the at least one first surface or a depth region of the substrate body under the at least one first surface there is a tensile stress at least in areas, wherein an absolute value of the tensile stress at least one of corresponds to a compressive stress in the first coating or is between 1 MPa and 100 MPa.

13. The composite workpiece of claim 1, wherein the composite workpiece has a circular or oval-shaped cut surface in at least one cutting plane, wherein the cut surface has a maximum diameter of at least one of:
less than or equal to 500 mm, less than or equal to 300 mm, less than or equal to 200 mm, less than or equal to 150 mm, greater than or equal to 50 mm, greater than or equal to 100 mm, greater than or equal to 150 mm, greater than or equal to 200 mm, or greater than or equal to 300 mm.

14. The composite workpiece of claim 1, further comprising a second coating and wherein at least the at least one second surface of the substrate body is coated at least in areas with the second coating, wherein the second coating at least one of: is UV-curable, has an optical refractive index adapted to the material of the substrate body, comprises a plastic, comprises at least one structure, or forms at least one structure which can be applied or is applied to the substrate body;
wherein at least one of:
only the at least one second surface of the substrate body is coated with the second coating; or
the at least one first surface of the substrate body is not coated with the second coating.

15. A plurality of composite workpieces, each of the composite workpieces comprising:
a substrate body comprising at least one first surface and at least one second surface, the at least one first surface of the substrate body being shaped convexly at least in areas and the at least one second surface of the substrate body being shaped concavely at least in areas, and the composite workpieces each have a bow with an absolute value of between 0.1 μm and 50 μm due to the curved shape of the at least one first surface and the at least one second surface; and a first coating, the at least one first surface of the substrate body being coated at least in areas with the first coating; wherein a probability of failure of the composite workpieces when a force of 100 Newtons is applied to the at least one second surface of the individual substrate bodies is less than or equal to 1%.

16. Augmented reality glasses, comprising:

at least one composite workpiece comprising:

a substrate body comprising at least one first surface and at least one second surface, the at least one first surface of the substrate body being shaped convexly at least in areas and the at least one second surface of the substrate body being shaped concavely at least in areas, and the composite workpiece has a bow with an absolute value of between 0.1 μm and 50 μm due to the curved shape of the at least one first surface and the at least one second surface; and a first coating, at least the at least one first surface of the substrate body being coated at least in areas with the first coating, wherein for a Young's modulus of a material of the substrate body (E), a Poisson's ratio of the material of the substrate body (v), a radius of curvature of the composite workpiece (R), a thickness of the substrate body (D), a thickness of the first coating (d), and for a compressive stress in the first coating (S), the relation $$S = \frac{E}{1-v}\frac{D^2}{6Rd}$$

is satisfied.

* * * * *